No. 710,653. Patented Oct. 7, 1902.
R. R. ANDERSON.
EDUCATIONAL CHART AND SUPPORT THEREFOR.
(Application filed Apr. 21, 1902.)
(No Model.) 2 Sheets—Sheet 1.
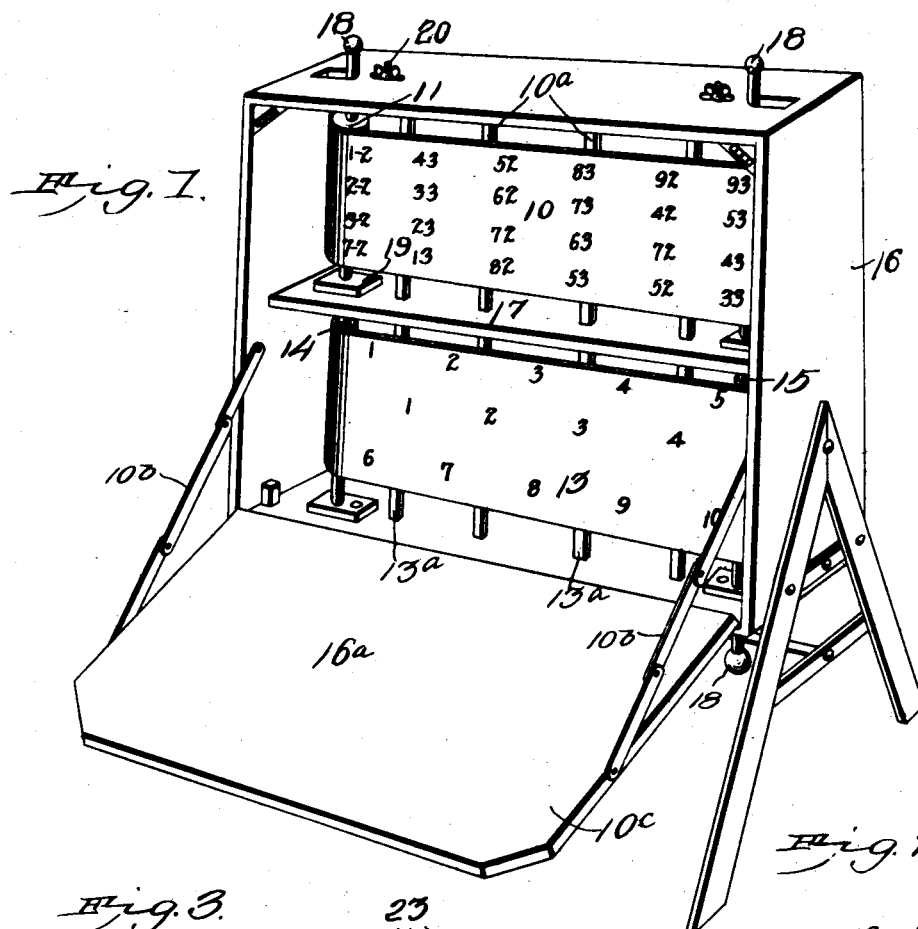

No. 710,653. Patented Oct. 7, 1902.
R. R. ANDERSON.
EDUCATIONAL CHART AND SUPPORT THEREFOR.
(Application filed Apr. 21, 1902.)
(No Model.) 2 Sheets—Sheet 2.
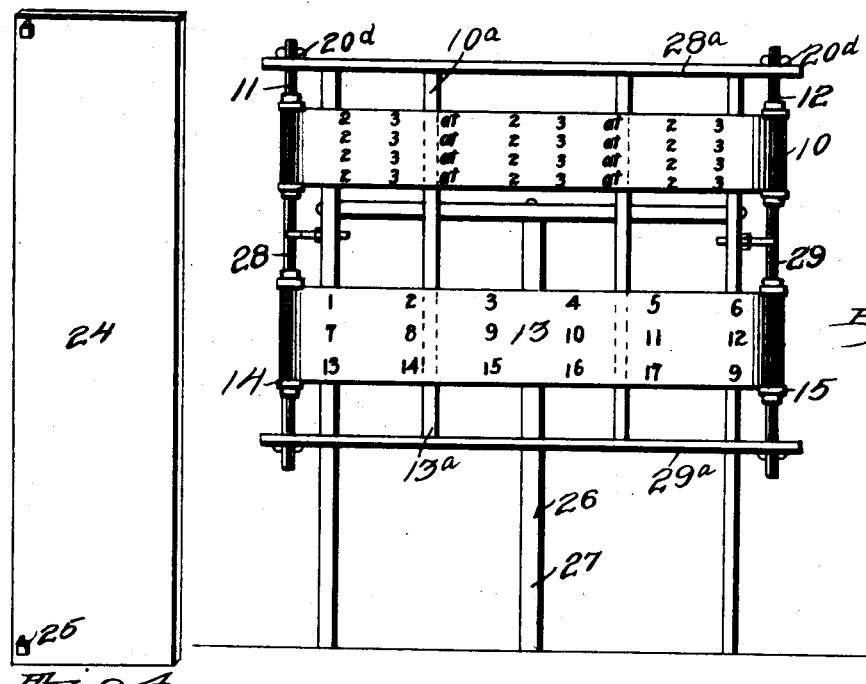
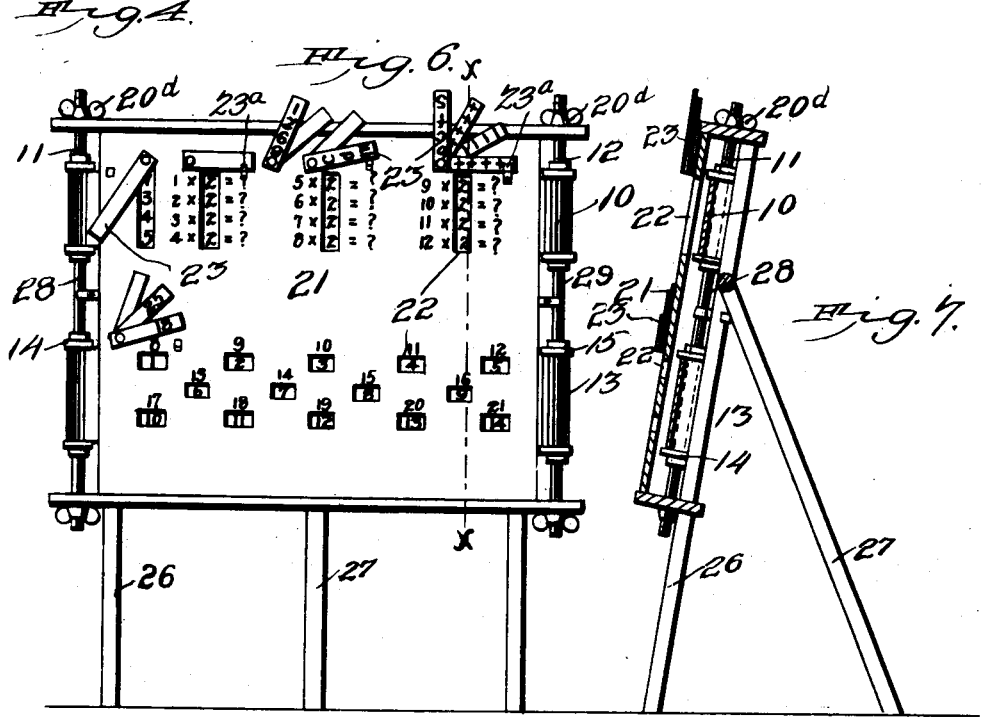
Witnesses
E. J. Stewart
C. M. Woodward
R. R. Anderson, Inventor.
by C. A. Snow & Co.
Attorneys

UNITED STATES PATENT OFFICE.

RICHARD ROBERT ANDERSON, OF ALBION, IOWA.

EDUCATIONAL CHART AND SUPPORT THEREFOR.

SPECIFICATION forming part of Letters Patent No. 710,653, dated October 7, 1902.

Application filed April 21, 1902. Serial No. 103,984. (No model.)

*To all whom it may concern:*

Be it known that I, RICHARD ROBERT ANDERSON, a citizen of the United States, residing at Albion, in the county of Marshall and State of Iowa, have invented a new and useful Educational Chart and Support Therefor, of which the following is a specification.

This invention relates to charts for educational purposes, and has for its object to provide means whereby mathematical problems or examples of an indefinite number and variety and sentences, words, syllables, or letters representing sounds with diacritical markings of an indefinite number and variety in reading may be displayed and readily changed to matter corresponding in character by a simple adjusting means; and the invention consists in certain novel features of construction, as hereinafter shown and described, and specifically pointed out in the claims.

In the drawings illustrative of the invention, Figure 1 is a perspective view of the framework of the device inclosing the chart with the screen removed. Fig. 2 is a vertical section taken through the casing of the device with the lid or cover folded. Fig. 3 is a perspective view of the screen removed. Fig. 4 is a perspective view of the supplemental screen or shut-off plate removed. Fig. 5 is a front elevation with the screen removed, illustrating a modification in the construction of the supporting-framework. Fig. 6 is a view of the same with the screen in position. Fig. 7 is a vertical section on the line $x\ x$ of Fig. 6.

The principal features of the device are a sheet or chart containing the matter of information which it is designed to impart and a screen having perforations disposed to disclose portions of the matter on the chart and preferably containing information which may be employed in connection with or explanatory of the information revealed through the perforations. The sheet or chart may be made in as many parts or sections as required, but preferably two will be employed, as in the drawings; but a greater number may be employed, especially in the modification shown in Figs. 5, 6, and 7, wherein additional sheets may readily be inserted by lengthening the supporting-rods. The sheets may be arranged, as represented at 10, in the form of an endless belt running over spaced rollers 11 12 and a lower section (represented at 13) connected by its ends to spaced drums 14 15 and adapted to be wound from one to the other in either direction. Two forms of the supporting-frame are shown, one in Figs. 1 and 2 in the form of an inclosing casing or box supported upon detachable legs and the other in skeleton form, as in Figs. 5, 6, and 7, and either form may be employed, as preferred, as the operation of the charts or belts and the perforated screens is substantially the same in both. In the rear of the belts 10 and 13 supporting-strips $10^a\ 13^a$ will be arranged to prevent the belts sagging inward. If preferred, both sections may be endless and arranged as in the upper part of the figure or both may be in the form represented in the lower part of the figure. Placed in any suitable manner upon the outer face of these belts will be characters, figures, or other information and in any desired order. The drums or rollers 11 12 and 14 15 are supported in an inclosing casing or frame 16, with a longitudinal intermediate partition 17, the inner journals of the drums or rollers being all "stepped" in the partition from opposite sides, the outer journals of the same passing through apertures in the upper and lower sides of the casing and provided outside the casing with operating-knobs 18, as shown. By this means the belts may be operated from outside the casing. The apertures through which the journals of the drums or rollers pass in the top and bottom of the casing 16 and also where they are stepped in the partition 17 will be elongated and each journal supported by a block 19, adapted to be adjusted by clamp-bolts 20, so that the tension of the belts may be maintained and the drums or rollers supported in proper alinement. By this means any desired part of the surfaces of the belts may be exhibited.

Supported in front of the belts 10 13 is a screen (indicated at 21) having a series of apertures 22. These apertures will be in alinement with the matter upon the belts 10 13 and may be varied to any extent as the matter upon the charts is varied, and the surface of the screen 21 adjacent to the apertures will be occupied by matter explanatory of or supplemental to the matter upon the belts. The screen 21 adjacent to one or more of the apertures will be provided with movable plates 23, either singly, as in the upper left hand in Figs. 3 and 6, or in superimposed groups, as at the upper right hand in the same figures, these plates to be occupied with characters which are employed to denote addition, subtraction, division, and other mathematical characters, or with figures, letters, or other characters or words or parts of words, which may be employed in connection with or supplemental to or explanatory of the matter on the belts as the latter are moved forward or backward to bring the required characters in view through the apertures. The pivoted plates 23 will be provided with suitable supports 23ᵃ, adapted to sustain the outer ends of the plates when not in use, as in Figs. 3 and 6. These supports may be of any approved form—such as straps, lugs, or catches of any desired form—and permanently attached to the screen 21. The matter upon the plates may be varied to any required extent, and any desired character or matter may be placed thereon or on the screen to adapt the device to the various purposes for which it is adapted to be employed. The screen is removable from the casing, so that the charts may be easily accessible or screens containing different characters substituted.

The matter on one chart may be supplementary to or explanatory of the matter on the other, or the charts may be entirely independent, as required.

In order that the visible matter on one chart may not be confusing to or distract the attention of the pupil, a supplemental screen 24 is provided, adapted to be attached to the screen 21 to form a shield or cover to the perforations opposite either the upper or lower chart, so that only the matter upon which attention is for the time being to be concentrated shall be in view. This supplemental screen may be attached by any suitable means, such as pins 25, engaging perforations 26 in the screen 21. The casing 16 will be provided with a hinged cover 16ᵃ, preferably supported by hangers 10ᵇ and with its interior surface 10ᶜ covered by blackboard material for the use of the pupil when required. The rear of the frame 16 may also be provided with a movable door, as indicated at 16ᵈ in Fig. 2, to permit access to the belts without removing the screen 21.

In Figs. 5, 6, and 7 some slight modifications in the construction are shown, consisting in forming the support for the charts in the form of an easel-like frame 26, with a supporting-leg 27, preferably hinged, and arranging the chart-supporting rollers or drums 11, 12, 14, and 15 on rods 28 29, passing through the drums and apertures in top and bottom bars 28ᵃ 29ᵃ and suitably supported therein and having thumb-handles, as 20ᵈ, whereby they may be turned.

The charts and screens are the same in both structures and the parts coact to produce the same results in substantially the same manner in both structures.

It is obvious that changes in the form, size, proportions, and minor details may be made without departing from the spirit or principle of the invention or sacrificing any of its advantages.

Having thus described my invention, what is claimed as new is—

1. In a device of the character described, a screen having apertures therein and provided with plates adapted to be moved into conjunctive position adjacent to said apertures, substantially as set forth.

2. A device of the character described, comprising supporting means, belts movable upon said supporting means and having characters, numbers, and the like thereon, a screen in front of said belts and having apertures for exposing portions of the latter, and plates adapted to be moved into conjunctive position adjacent to said apertures, substantially as shown and described.

3. A device of the character described, comprising supporting means, belts movable upon said supporting means and having characters, numbers, and the like thereon, a screen in front of said belts and having apertures for exposing portions of the latter, and two or more superimposed plates adapted to be independently moved into conjunctive position adjacent to said apertures, substantially as shown and described.

4. A device of the character described comprising supporting means, belts movable upon said supporting means and having characters, numbers, and the like, thereon, a screen in front of said belt having apertures for exposing portions of the latter and sets of superimposed plates connected pivotally with said screen adjacent to the apertures therein and adapted to be independently moved into conjunctive position adjacent to said apertures, substantially as set forth.

5. In a device of the character described, a supporting-casing having an intermediate partition, spaced rollers revolubly supported by one end in opposite sides of said partition and by their outer ends in opposite sides of said casing and adapted to be independently revolved, belts movable upon said rollers, a screen supported in said casing in front of said belts and having apertures through which portions of said belts are visible, and a supplemental detachable screen adapted to cover a portion of the apertured screen so as to conceal it from view, substantially as set forth.

6. In a device of the character described, a supporting-frame, spaced rollers revolubly disposed in said frame, a belt movable upon said rollers, means for revolving said rollers, means for independently adjusting said rollers, and a screen carried by said frame and having apertures through which portions of said belt are visible, substantially as shown and described.

7. In a device of the character described, a framework, belts movably disposed within said framework, a screen carried by said framework and having perforations through which portions of said belts are visible, a supplemental imperforate screen adapted to be movably attached to said perforated screen to conceal portions of said perforations through which parts of one or the other of said belts are visible, substantially as shown and described.

8. In a device of the character described, a framework, a belt movably disposed within said framework, a screen carried by said framework, and having perforations through which portions of said belt are visible, and a closure to said framework having an interior blackboard-surface, substantially as shown and described.

9. In a device of the character described, the combination of a supporting-frame, spaced rods adjustably supported in said frame, drums mounted revolubly upon said rods, belts mounted upon said drums, means for adjusting the rods, a screen having apertures through which portions of said belts are visible, plates connected with said screen and adapted to be moved in conjunctive position adjacent to the apertures therein, and an auxiliary screen adapted to cover as much of the apertured screen as exposes one of the belts, substantially as described.

In testimony that I claim the foregoing as my own I have hereto affixed my signature in the presence of two witnesses.

RICHARD ROBERT ANDERSON.

Witnesses:
F. M. TANNAHILL,
EMILY ANDERSON.